No. 658,249. Patented Sept. 18, 1900.
C. G. ENSIGN.
MOTOR VEHICLE WHEEL.
(Application filed Dec. 29, 1899.)
(No Model.) 2 Sheets—Sheet 1.
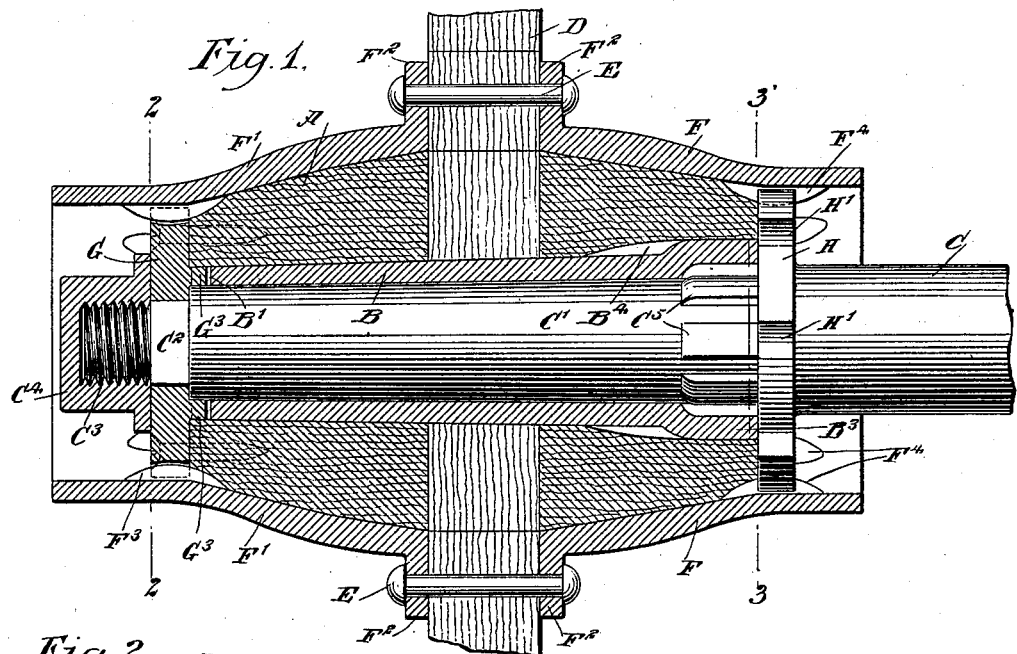
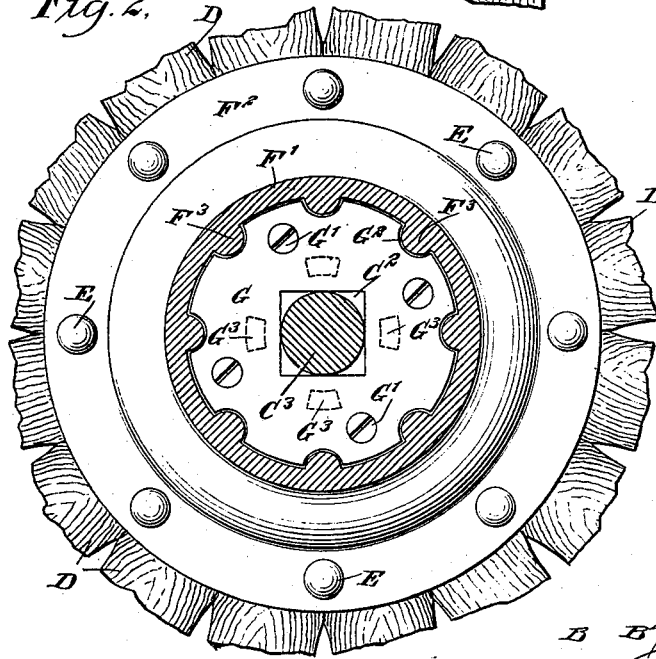
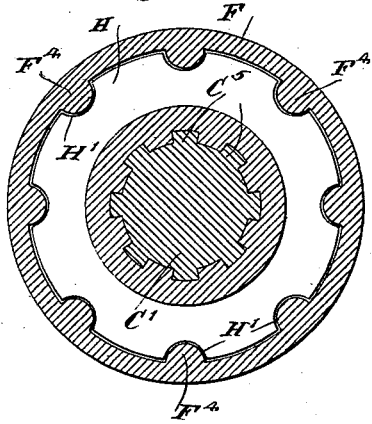
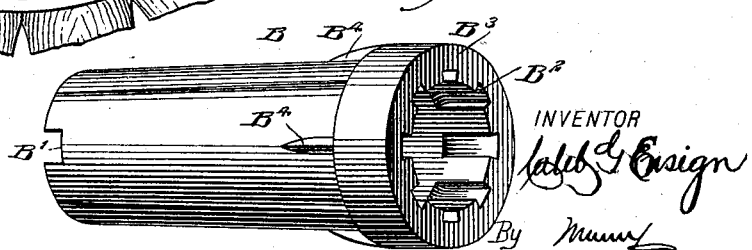

No. 658,249. Patented Sept. 18, 1900.
C. G. ENSIGN.
MOTOR VEHICLE WHEEL.
(Application filed Dec. 29, 1899.)

(No Model.) 2 Sheets—Sheet 2.

WITNESSES: Edward Thorpe

INVENTOR
C. G. Ensign
BY
ATTORNEYS

UNITED STATES PATENT OFFICE.

CALEB G. ENSIGN, OF MADISON, OHIO.

MOTOR-VEHICLE WHEEL.

SPECIFICATION forming part of Letters Patent No. 658,249, dated September 18, 1900.

Application filed December 29, 1899. Serial No. 741,917. (No model.)

*To all whom it may concern:*

Be it known that I, CALEB G. ENSIGN, a citizen of the United States, and a resident of Madison, in the county of Lake and State of Ohio, have invented certain new and useful Improvements in Motor-Vehicle Wheels, of which the following is a full, clear, and exact description.

The invention relates to motor-vehicles having wheels preferably of the Sarven type; and its object is to provide certain new and useful improvements in vehicle-wheels whereby power can be applied either to the hub or the axle to propel the vehicle without danger of unloosening the hub-box or unfastening the hub-flanges.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 5:
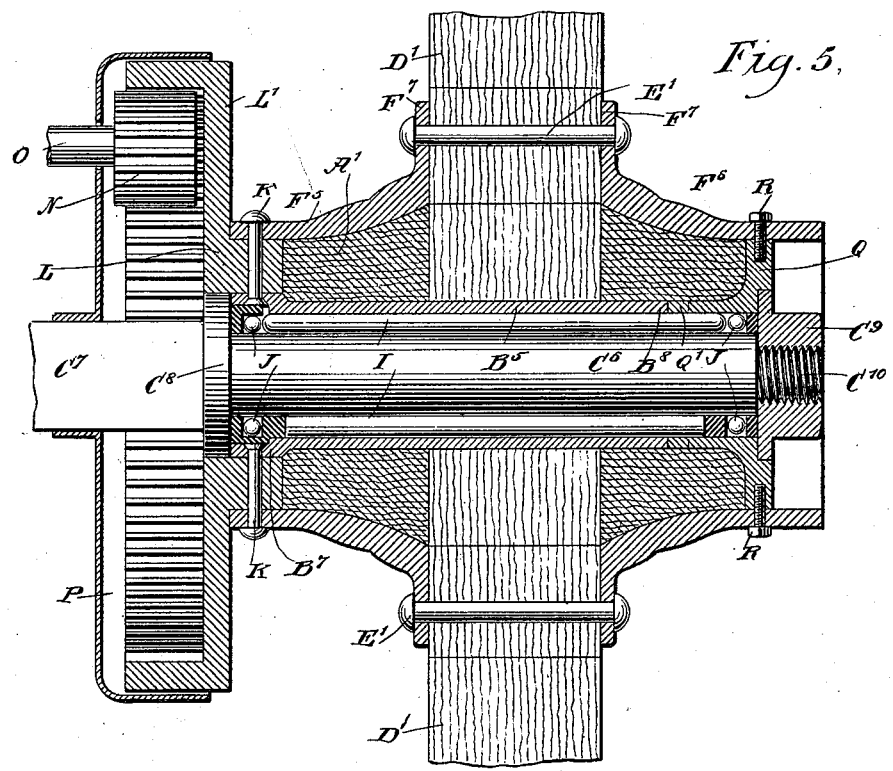

Figure 1 is a longitudinal section of the improvement as arranged for a driven axle. Fig. 2 is a cross-section of the same on the line 2 2 in Fig. 1. Fig. 3 is a similar view of the hub-box on the line 3 3 in Fig. 1. Fig. 4 is a perspective view of the hub-box. Fig. 5 is a longitudinal section of the improvement with the driving-gear applied to the hub of the wheel, and Fig. 6 is a perspective view of the hub-box for the arrangement shown in Fig. 5.

The well-known Sarven wheel has its wooden spokes driven into the wooden hub, and the latter carries the box, and the peripheral surface of the hub is covered by metallic bands bolted together at their flanges, the bolts passing through the joint of the adjacent spokes. In order to use this well-known wheel on modern motor-vehicles in which power is applied either to the axle or to the hub, it is necessary that the ordinary construction be changed, as otherwise the box is liable to become loose in the hub in case the axle is driven, or the flanges of the bands are liable to become unfastened in case the hub is connected with the driving-gear. To avoid either of the dangers mentioned and to construct a wheel in which the metallic box and the metallic covering of the hub are firmly united with each other to give extreme rigidity to the wheel is the object of the invention presently to be described in detail, it being, however, expressly understood that the essential features of the Sarven wheel are retained to produce a wheel of extremely-high efficiency and of special service in modern motor-vehicles.

The vehicle-wheel illustrated in Figs. 1, 2, 3, and 4 is provided with a wooden hub A, into which is fitted a metallic box B, engaged by the spindle C' of the axle C, connected in a suitable manner with the motor to be rotated by the same for propelling the vehicle by turning the box B. The hub A carries the spokes D, having the usual rim and tire at their outer ends. The wooden spokes D are driven into the hub A in the usual manner, and through the joints of the same adjacent to the spokes are passed the usual rivets or bolts E for connecting the flanges $F^2$ of the metallic bands F F' with each other, said metallic bands inclosing the wooden hub A, as indicated in the drawings. In order to rigidly connect the axle C with the metallic bands F F' and to connect the metallic hub B with said bands to insure extreme rigidity of the wheel, the following device is provided, arranged to leave the Sarven wheel construction as above outlined completely intact. On a polygonal offset $C^2$ on the outer end of the spindle C' is fitted a plate G, secured by screws G' to the hub A and formed in its periphery with recesses $G^2$, engaged by projections $F^3$ integral with the band F' and arranged on the interior surface thereof. On the inner face of the plate G are arranged lugs $G^3$, engaging corresponding recesses B' in the outer end of the metallic box B, so that the plate G forms a rigid connection between the axle C, the box B, and the band F' without interfering with the construction of the hub A and the spokes D, set in the hub, the flanges $F^2$ engaging the sides of the spokes in the usual manner. The outer face of the plate G is engaged by a nut $C^4$, screwing on the threaded end $C^3$, extending outwardly from the offset $C^2$ of the spindle C'. The inner end of the spindle C' is formed with lugs or ribs $C^5$, engaging corresponding recesses $B^2$ in the head $B^3$ of the box B, and the latter is provided with longitudinal ribs $B^4$, engaging corresponding recesses in the hub A. Between the spindle C' and the axle C proper is secured a head or plate H, formed in its periphery with recesses H', engaging corresponding lugs $F^4$ integral with the band F and formed on the inner surface thereof, as is plainly indicated in Figs. 1 and 3. By the construction just described the lugs $C^5$ form a rigid connection with the box B, and as said lugs $C^5$ and the plate H are integral with the axle and the plate H engages the band F it is evident that a rigid connection is established between the several parts at the inner end of the hub of the wheel the same as on the outer end of the wheel-hub and above described.

Figure 6:
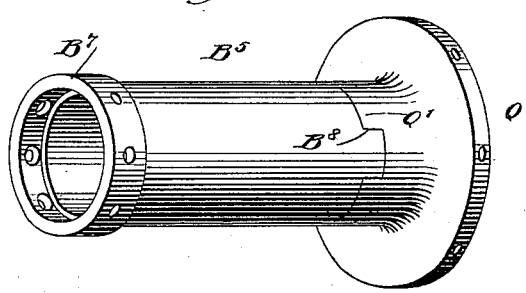

In the arrangement illustrated in Figs. 5 and 6 the wooden hub A' receives the spokes D' and the flanges $F^7$ of the hub-bands $F^5$ $F^6$ are connected with each other by rivets or bolts E'. The box $B^5$ is connected by roller-bearings I and ball-bearings J with the spindle $C^6$ of the axle $C^7$, and the inner end $B^7$ of the box $B^5$ is connected by radially-extending bolts K with the band $F^5$, the bolts or rivets passing through a ring or hub L, intermediate the end $B^7$ of the box $B^5$ and the band $F^5$ at the inner end of the hub A'. The ring or hub L is formed on an internal gear-wheel L' in mesh with a pinion N on a shaft O, connected with the motor, so that the rotary motion given to said shaft and pinion N causes the wheel L' to rotate, and as said wheel is connected by the ring or hub L with the box $B^5$ and the flange $F^5$ it is evident that a rotary motion is given to the wheel to propel the vehicle. By the construction described the connection between the driven part and the wheel is at the metal portions of the wheel only and without changing the construction of the hub, spokes, or flanged bands, which parts form the essential features of a Sarven wheel. The outer end of the box $B^5$ is connected by interlocking teeth $B^8$ and Q' with an extension-plate Q, fitted against the outer end of the hub A' and into the band $F^6$, as plainly shown in Fig. 5, screws R screwing through the band $F^6$ into the plate Q to securely hold the latter in position and to rigidly connect the box $B^5$ with the band $F^6$. The head $C^8$ of the axle fits into the ring or hub L and the nut $C^9$ on the outer threaded end $C^{10}$ of the spindle abuts against the plate Q to hold the ball and roller bearings in proper position and also to hold the box $B^5$ from longitudinal movement on the spindle. The extension-plate Q may be integral with the box $B^5$ proper.

I do not limit myself to the particular forms of Sarven wheels described, as it is clearly evident that my construction may be applied to other forms of wheels; nor do I limit myself to the special forms of the interlocking lugs and notches between the plates G and H and the bands F F' and those between the plate H and hub-box B and the ones between the spindle and the hub-box at the inner end thereof.

Having thus fully described my invention, I claim as new and desire to secure by Letters Patent—

1. A wheel for motor-vehicles, comprising a wooden hub, wooden spokes inserted therein, a metallic covering for the outside of said hub, a power-receiving part adapted for driving connection with the motor, and a metallic connection between said power-receiving part and said covering.

2. A wheel for motor-vehicles, comprising a wooden hub, wooden spokes inserted therein, metallic bands surrounding the hub at each side of the spokes, a metallic connection extending from one band to the other across the spokes, a power-receiving part adapted for driving connection with the motor, and a metallic connection between said power-receiving part and one of the said bands.

3. A vehicle-wheel having a wooden hub, a metallic covering on the outside thereof, an axle within the hub, and a metallic connection between the axle and the covering to compel them to rotate in unison.

4. A vehicle-wheel having a hub, a metallic covering on the outside thereof, a hub-box located within the hub and provided on its outer surface with projections interlocking with the hub, an axle located within the hub-box and having projections engaging recesses of the hub-box, and collars secured to the axle to rotate therewith and projecting outwardly to an interlocking engagement with the hub-covering.

5. A vehicle-wheel having a hub, a metallic covering located on the outside thereof and having projections on its inner surface, an axle within the hub, and a metallic collar surrounding the axle and held to rotate therewith, said collar having at its periphery notches for the reception of the projections on the inside of the metallic covering, whereby said covering will be compelled to rotate with the axle.

6. A vehicle-wheel having a hub, a metallic covering on the outside thereof, a hub-box located within the hub and provided on its outer surface with spaced longitudinal projections or ribs interlocking with the hub, an axle located within the hub-box and having longitudinal projections or ribs engaging recesses of the hub-box, and collars secured to the axle to rotate therewith and projecting outwardly to an interlocking engagement with the hub-covering.

7. A vehicle-wheel having a hub, a metallic covering located on the outside of the hub and having longitudinal projections or ribs upon its inner face, a hub-box located within the hub and provided on its outer surface with spaced longitudinal projections or ribs interlocking with the hub, an axle located within the hub-box and having longitudinal projections or ribs engaging recesses of the hub-box, and collars secured to the axle to rotate therewith and located at the ends of the hub, said collars having at their peripheries, recesses to receive the projections of the hub-covering.

In testimony whereof I have signed my name to this specification in the presence of two subscribing witnesses.

CALEB G. ENSIGN.

Witnesses:
H. M. RAND,
CHARLES W. SEARLS.